United States Patent

Zetterblad

[11] Patent Number: 5,901,364
[45] Date of Patent: May 4, 1999

[54] ARRANGEMENT IN MOBILE TELECOMMUNICATION SYSTEMS FOR PROVIDING FOR AN IMPROVED HAND-OVER FUNCTION

[75] Inventor: Johan Zetterblad, Hägersten, Sweden

[73] Assignee: Televerket, Farsta, Sweden

[21] Appl. No.: 08/337,197

[22] Filed: Nov. 7, 1994

Related U.S. Application Data

[63] Continuation of application No. 08/015,138, Feb. 9, 1993, abandoned.

[30] Foreign Application Priority Data

Feb. 24, 1992 [SE] Sweden .................................. 9200537

[51] Int. Cl.[6] ...................................................... H04Q 7/32
[52] U.S. Cl. ........................... 455/550; 455/446; 455/436
[58] Field of Search ................................. 379/21, 27, 60, 379/58, 59; 340/825.44; 455/33.1, 51.2, 54.2, 70, 436–437, 439, 446, 423–424, 550; 370/170

[56] References Cited

U.S. PATENT DOCUMENTS

| | | |
|---|---|---|
| 4,048,564 | 9/1977 | Gleeson, Jr. . |
| 4,696,027 | 9/1987 | Bonta ........................................ 379/60 |
| 4,765,753 | 8/1988 | Schmidt . |
| 4,977,399 | 12/1990 | Price et al. .......................... 340/825.44 |
| 5,159,593 | 10/1992 | D'Amico et al. ....................... 370/95.3 |
| 5,179,549 | 1/1993 | Joos et al. ................................... 370/17 |
| 5,179,559 | 1/1993 | Crisler et al. .......................... 370/95.1 |
| 5,181,200 | 1/1993 | Harrison ................................. 370/85.1 |
| 5,203,010 | 4/1993 | Felix et al. .............................. 455/33.2 |
| 5,239,682 | 8/1993 | Strawcynski et al. ................. 455/54.1 |
| 5,241,686 | 8/1993 | Charbonnier ........................... 455/33.2 |
| 5,257,402 | 10/1993 | Crisler .................................... 455/33.2 |
| 5,329,531 | 7/1994 | Diepstraten et al. ................... 370/94.2 |
| 5,398,276 | 3/1995 | Lemke et al. .............................. 379/21 |
| 5,425,076 | 6/1995 | Knippelmier .............................. 379/27 |
| 5,432,842 | 7/1995 | Kinoshita et al. . |
| 5,450,615 | 9/1995 | Fortune et al. ......................... 455/67.6 |
| 5,521,958 | 5/1996 | Selig et al. ................................. 379/21 |
| 5,528,660 | 6/1996 | Heins et al. ............................... 379/21 |
| 5,542,119 | 7/1996 | Grube et al. ........................... 455/51.2 |
| 5,542,120 | 7/1996 | Smith et al. ........................... 455/54.1 |

FOREIGN PATENT DOCUMENTS

| | | |
|---|---|---|
| 9119403 | 12/1991 | WIPO . |
| 2012602 | 7/1992 | WIPO ..................................... 379/60 |
| 9212602 | 7/1992 | WIPO . |

OTHER PUBLICATIONS

Mende, "On the Hand–Over Rate in Future Cellular Systems", Jun. 1988, IEEE p. 492.

Kanai, Taketsugu and Kondo, "Experimental Digital Cellular System for Microcellular Handoff", IEEE, Apr. 1990.

*Primary Examiner*—Dwayne D. Bost
*Assistant Examiner*—William G. Trost
*Attorney, Agent, or Firm*—Oblon, Spivak, McClelland, Maier & Neustadt, P.C.

[57] ABSTRACT

An arrangement in mobile telecommunication systems which operate with cells to provide for an improved hand-over function of a mobile unit which is located in a cell which belongs to a first base station to a cell which belongs to a second base station. The mobile unit is provided with elements for measuring and evaluating parameters which are significant to the hand-over function on the one hand in the real traffic case and on the other hand in a simulated traffic case. A comparing element is arranged in the mobile unit and the said first and second representation are included as selection criteria for obtaining the improved hand-over function.

6 Claims, 1 Drawing Sheet

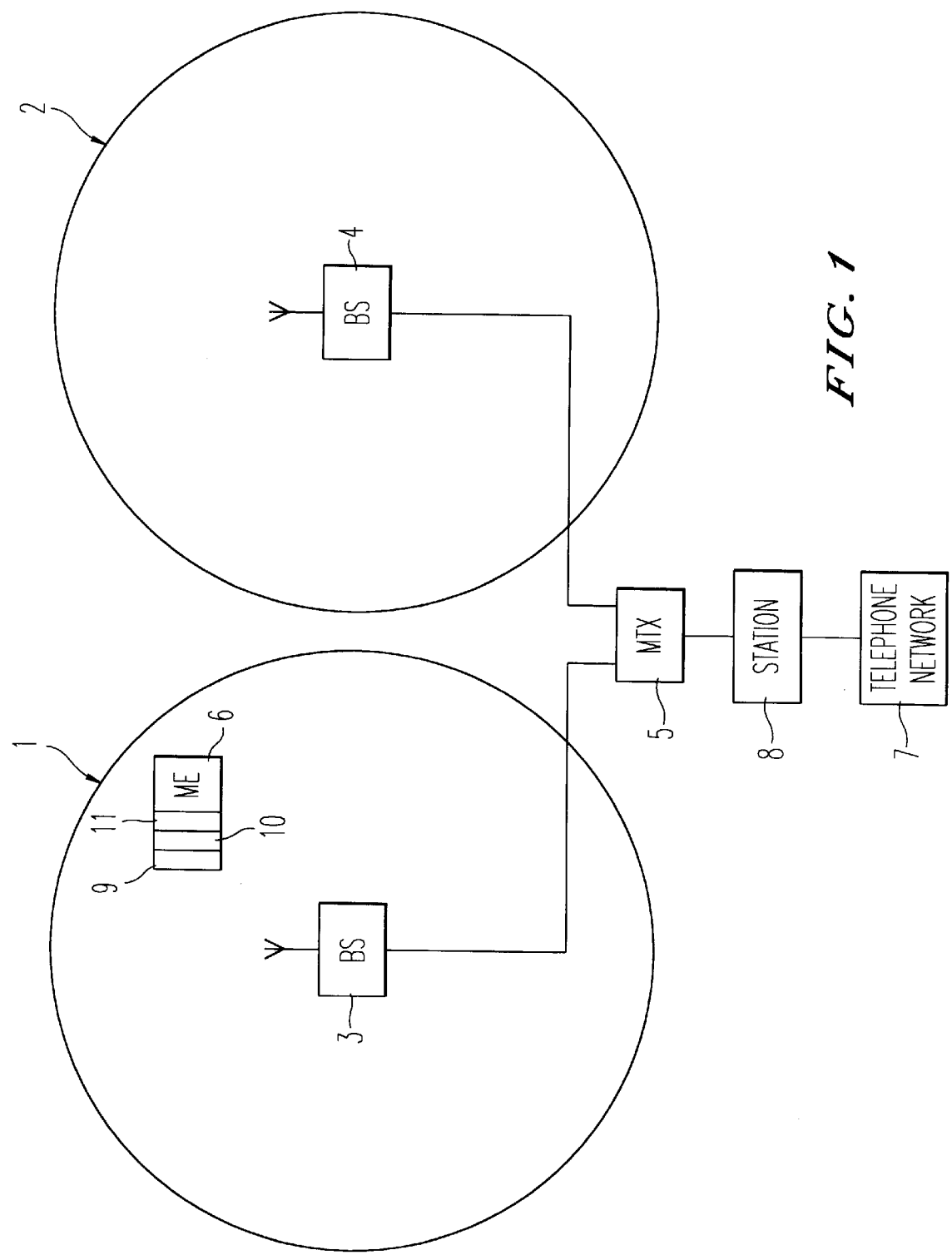

ARRANGEMENT IN MOBILE TELECOMMUNICATION SYSTEMS FOR PROVIDING FOR AN IMPROVED HAND-OVER FUNCTION

This application is a continuation of application Ser. No. 08/015,138, filed on Feb. 9, 1993, now abandoned.

TECHNICAL FIELD

The present invention relates to an arrangement in mobile telecommunication systems which operate with cells. These mobile systems most frequently comprise on the one hand a number of base stations operating with cells, which are connected by means of a number of mobile telephone switches to a network system, and on the other hand a number of mobile units.

Hand-over of a mobile unit from a cell belonging to a first base station to a cell belonging to a second base station is controlled in the system by a hand-over algorithm with a number of measured parameters and a large number of algorithm parameters as input data. As an example, a GSM system can be in place in which there needs to be a determination of about 80 parameters for each cell for a hand-over function.

The arrangement is also of the type which comprises elements for measuring parameters which affect the hand-over and evaluation of these and algorithm parameters.

PRIOR ART

It has already been known to carry out a large number of field measurements to obtain an idea of how a mobile unit performs on hand-over from a cell belonging to a first base station to a cell belonging to a second base station in a mobile telecommunication system. It is characteristic of these measurements that they only provide an idea of a hand-over with the current parameter setting in the mobile system.

DESCRIPTION OF THE INVENTION

TECHNICAL PROBLEM

To obtain an idea of how a mobile unit performs on hand-over from a cell belonging to a first base station to a cell belonging to a second base station, one has previously been forced to carry out a large number of field measurements. It has then been possible to use the values obtained from the field measurements by means of calculations to create an idea/representation of a hand-over from a first cell to a second cell. The idea/representation obtained has been valid for the current mobile telecommunication system, with the parameter setting which the affected base stations had on the occasion of the measurement.

With the establishment of new base stations in an existing mobile telecommunication system or the establishment of a completely new system, the parameter setting of the base stations has been essential for the loading in the network and the quality experienced by the customers. To be able to set the parameters of new base stations, one has therefore been forced to create an idea/representation of how the new base station influences the hand-over function in the system. This idea/representation has been obtained by means of manual calculations. These calculations have been of a very comprehensive character where the number of parameters one has been forced to take into consideration has been unmanageably large, in some cases up to about 80. The idea/representation has therefore not been quite correct as to how the real system would work on hand-over. One has therefore also been forced to carry out a large number of field measurements after the base station has been established, in which parameters of the affected base stations which were then in operation were changed. These changes which have been carried out in the base stations have led to disturbances of the traffic in the system.

In modern mobile telecommunication systems there is a great requirement for parameter settings of new base stations or new systems to provide an optimum hand-over function. There is also a requirement that it should be possible to reduce the number of field measurements in the production of the parameter values. It should be possible to assemble the result from the field measurements in order to provide an idea of how a mobile unit performs on hand-over in the complete system. It is therefore essential that it should be possible to compare new parameter settings with respect to the hand-over function with the current parameter setting. It is also essential that it should be possible to evaluate different output powers, hand-over algorithms and frequency plans.

SOLUTION

It is the object of the present invention to solve the problems specified above and it should thereby be considered to be characterizing of the new arrangement that one or a number of mobile units is provided with the elements named in the introduction for measurement and evaluation. Measurement is carried out in a real traffic case on parameters which affect the hand-over. The measurement can be done in the field and in a manner previously known per se. A further feature is that the evaluating element establishes with the aid of the measured parameters and valid hand-over algorithm a first representation of how a mobile unit performs during the hand-over function in a real traffic case. The evaluating element is also arranged to generate simulated parameters which differ from the real parameters. These new simulated parameters can either represent a changed output power in the uplink and downlink or a changed frequency plan. The evaluating element generates a second representation of how a mobile unit performs during the hand-over function in a simulated traffic case in dependence on the generated parameters and an arbitrary hand-over algorithm. Finally, the arrangement is characterized in that an element containing the representations is arranged in one or a number of mobile units. The element containing the representations is arranged to produce first and second representations, respectively, in such a way that a selection can be made of the representation which corresponds to the improved hand-over function.

BRIEF DESCRIPTION OF THE DRAWINGS

FIG. 1 is a block diagram of a preferred embodiment of the present invention.

DETAILED DESCRIPTION OF A PREFERRED EMBODIMENT

FIG. 1 shows a preferred embodiment of the invention. The arrangement is used in a mobile telecommunication system which operates with cells 1, 2. The system comprises on the one hand a number of base stations 3, 4 operating with cells, which are connected with a mobile telephone switch 5 to a network system, and on the other hand a number of mobile units 6. The mobile telephone switch 5 constitutes the interface to the normal fixed telephone network 7 and is connected to an exchange 8. In an established call between a mobile unit 6 and a base station 3, important parameters for the hand-over function are continuously measured. These measured parameters, together with the hand-over algorithm and its parameters decide whether and if so to which base station the mobile unit 6 will change over. In an automatic system of this type, it frequently happens that a mobile unit 6 can reach a number of base stations 3, 4 at the same time. To provide for an improved hand-over function, a mobile unit 6 is provided with measuring elements 9. The measuring elements 9 measure parameters which can be attributed to the real traffic case and which are significant for the real traffic case. The mobile unit 6 is also provided with an evaluating element 10 which with the aid of the measured parameters establishes a first representation of how the mobile unit 6 carries out a hand-over from a cell 1 belonging to a first base station 3 to a cell 2 belonging to a second base station 4 in the real traffic case. The evaluating element 10 is also arranged to generate simulated parameters. The simulated parameters differ from the real parameters and are intended for either being able to correspond to a changed output power in the uplink or downlink or a changed frequency plan, alternatively a new hand-over algorithm. With the aid of the simulated parameters, which are attributable to a simulated traffic case, the evaluating element 10 establishes a second representation of how a mobile unit 6 carries out a hand-over from a cell 1 belonging to a first base station 3 to a cell 2 belonging to a second base station 4 in a simulated traffic case. The evaluating element 10 is intended to be able to simulate one or a number of second representations in parallel with one another. An element 11 containing the representations is arranged in the mobile unit 6. The element 11 containing the representations represents the said first and second representations in such a way that a selection can be made of the representation which constitutes the improved hand-over function.

I claim:

1. A mobile unit for improving cell planning in a mobile telecommunications system including plural base stations, the mobile unit comprising:

measuring elements to make field measurements of real traffic parameters attributable to real traffic, wherein the real traffic parameters affect a hand-over function between the plural base stations; and an evaluating element for establishing how hand-overs between the plural base stations occur based on the real traffic parameters, wherein the evaluating element further comprises:

a simulated parameter generator which generates simulated parameters that differ from the real traffic parameters, and an evaluator for establishing how hand-overs between the plural base stations would occur based on the simulated parameters which differ from the real traffic parameters.

2. The mobile unit of claim 1, wherein the simulated parameter generator comprises:

a simulated parameter generator for generating simulated parameters corresponding to a changed output power in an uplink.

3. The mobile unit of claim 1, wherein the simulated parameter generator comprises:

a simulated parameter generator for generating simulated parameters corresponding to a changed output power in a downlink.

4. The mobile unit of claim 1, wherein the simulated parameter generator comprises:

a simulated parameter generator for generating simulated parameters corresponding to a changed frequency plan.

5. The mobile unit of claim 1, wherein the simulated parameter generator comprises:

a simulated parameter generator for generating simulated parameters corresponding to a changed output power in an uplink without changing an actual level of the output power in the uplink.

6. The mobile unit of claim 1, wherein the simulated parameter generator comprises:

a simulated parameter generator for generating simulated parameters corresponding to a changed output power in a downlink without changing an actual level of the output power in the downlink.

* * * * *